United States Patent [19]
Takimoto

[11] 3,896,903
[45] July 29, 1975

[54] SOLID LUBRICANT FEED DEVICE

[76] Inventor: Kiyotaka Takimoto, No. 16-2, Asahi-cho 2-chome, Fuchu, Tokyo, Japan

[22] Filed: Mar. 8, 1974

[21] Appl. No.: 449,460

[30] Foreign Application Priority Data
Mar. 20, 1973  Japan.............................. 48-32464

[52] U.S. Cl. ........... 184/99; 184/45 A; 308/DIG. 9; 401/81
[51] Int. Cl.²......................................... F16N 15/00
[58] Field of Search ........ 184/99, 60, 1 R, 1 E, 3 R, 184/3 A, 5, 6.16, 6.18, 6.19, 7 R, 7 A, 8, 9, 10, 12, 14, 15 R, 15 A, 16, 17, 21, 23, 26, 31, 45 R, 45 A, 46, 105 R; 308/98, DIG. 9, 76, 78, 79, 93, 106, 107, 170, 240; 401/68, 75, 19, 49, 52, 55, 61, 64, 66, 69–74, 76, 81–84, 86, 87

[56] References Cited
UNITED STATES PATENTS

| | | | |
|---|---|---|---|
| 1,694,153 | 12/1928 | Watres.............................. | 184/45 R |
| 1,877,495 | 9/1932 | Cater................................. | 308/240 |
| 2,655,261 | 10/1953 | Clark................................ | 401/81 X |
| 3,185,531 | 5/1965 | Modrey............................ | 308/240 X |

FOREIGN PATENTS OR APPLICATIONS

| | | | |
|---|---|---|---|
| 29,433 | 12/1909 | United Kingdom................. | 308/240 |

*Primary Examiner*—Richard J. Apley
*Assistant Examiner*—Arnold W. Kramer
*Attorney, Agent, or Firm*—McGlew and Tuttle

[57] ABSTRACT

A feed device holds a solid mass of lubricant molded in a spiral form, one end of the solid mass being in contact with a surface to be lubricated, and the other end being engaged with a spiral spring for imparting a spiral motion to the mass while pressing the mass to the surface to be lubricated along a spiral guide. The lubricant is continuously supplied to the surface to be lubricated by the thrust power of the spiral spring.

5 Claims, 6 Drawing Figures

SOLID LUBRICANT FEED DEVICE

BACKGROUND OF THE INVENTION

This invention relates to a device for feeding a moving surface with solid lubricant, and particularly a device for feeding solid lubricant to the flange surfaces of the wheels of a crane so as to reduce the frictional resistance between the flange and the track rail, thus preventing abrasion of their contact faces and assuring the smooth running of the crane.

In the conventional lubricant feed device of the above-mentioned type, the effective utilization length of solid lubricant in a unit space could not be large compared with the height of the unit space, because the lubricant feed device employed solid lubricant of arched or linear shape. Therefore, the solid lubricant must be exchanged frequently, and this was very inconvenient when it was used.

Thus, the object of the present invention is to provide a solid lubricant feed device which can have a large unit space permitting a greater effective utilization length and thereby eliminating the aforesaid defects of the conventional devices.

SUMMARY OF THE INVENTION

The above-mentioned object of the invention can be achieved by a solid lubricant feed device which comprises means for guiding the solid lubricant, formed in a spiral shape, toward a surface to be lubricated, means for providing the solid lubricant with a spiral motion, with one end of the spiral lubricant being in contact with the surface to be lubricated, while the other end is being engaged with means for imparting a spiral motion to the lubricant, the solid lubricant being continuously supplied to the surface to be lubricated when the spiral motion providing means is operative.

BRIEF DESCRIPTION OF THE DRAWINGS

The invention will become more readily apparent from the following detailed description taken in conjunction with the accompanying drawings, in which.

DESCRIPTION OF THE PREFERRED EMBODIMENT

The embodiment that will be described hereinafter by way of example includes a pair of the feed devices arranged to feed solid lubricant simultaneously to the flange surfaces of both wheels of a pair. As these supply devices have the same structure, only one of them will be described with respect to its structure and function.

Figure 1:
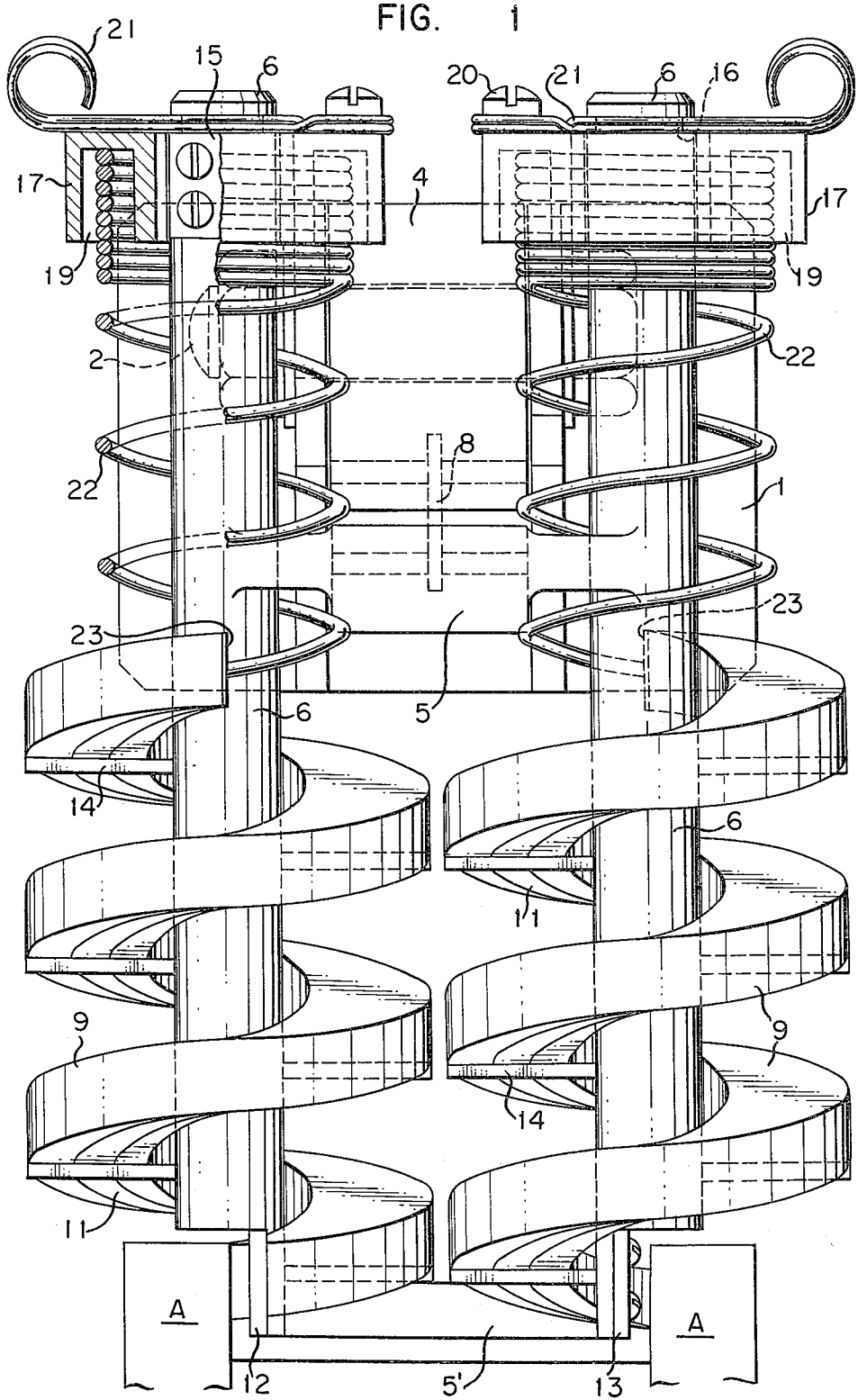
FIG. 1 is the front view of a feed device of the present invention.
Figure 2:
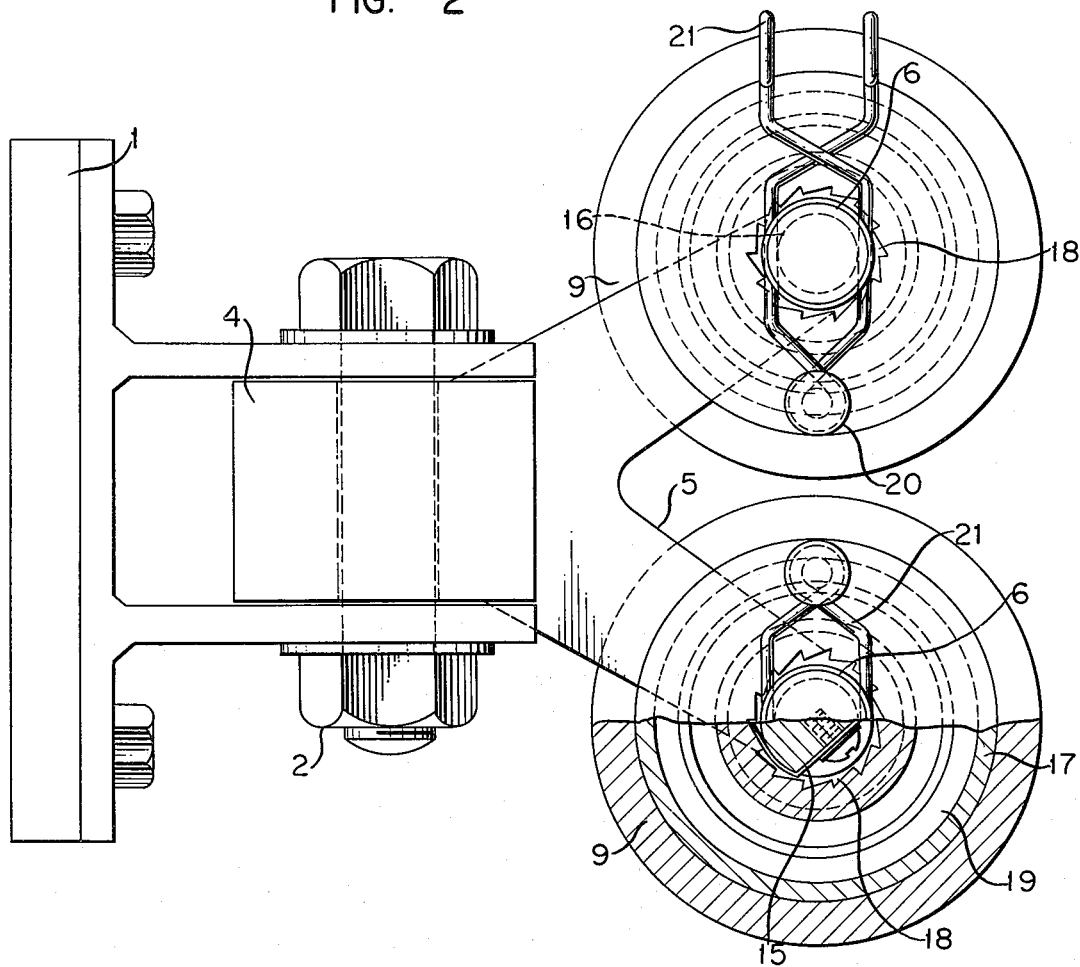
FIG. 2 is a top plan view, with parts broken away, of the supply device of FIG. 1.
Figure 3:
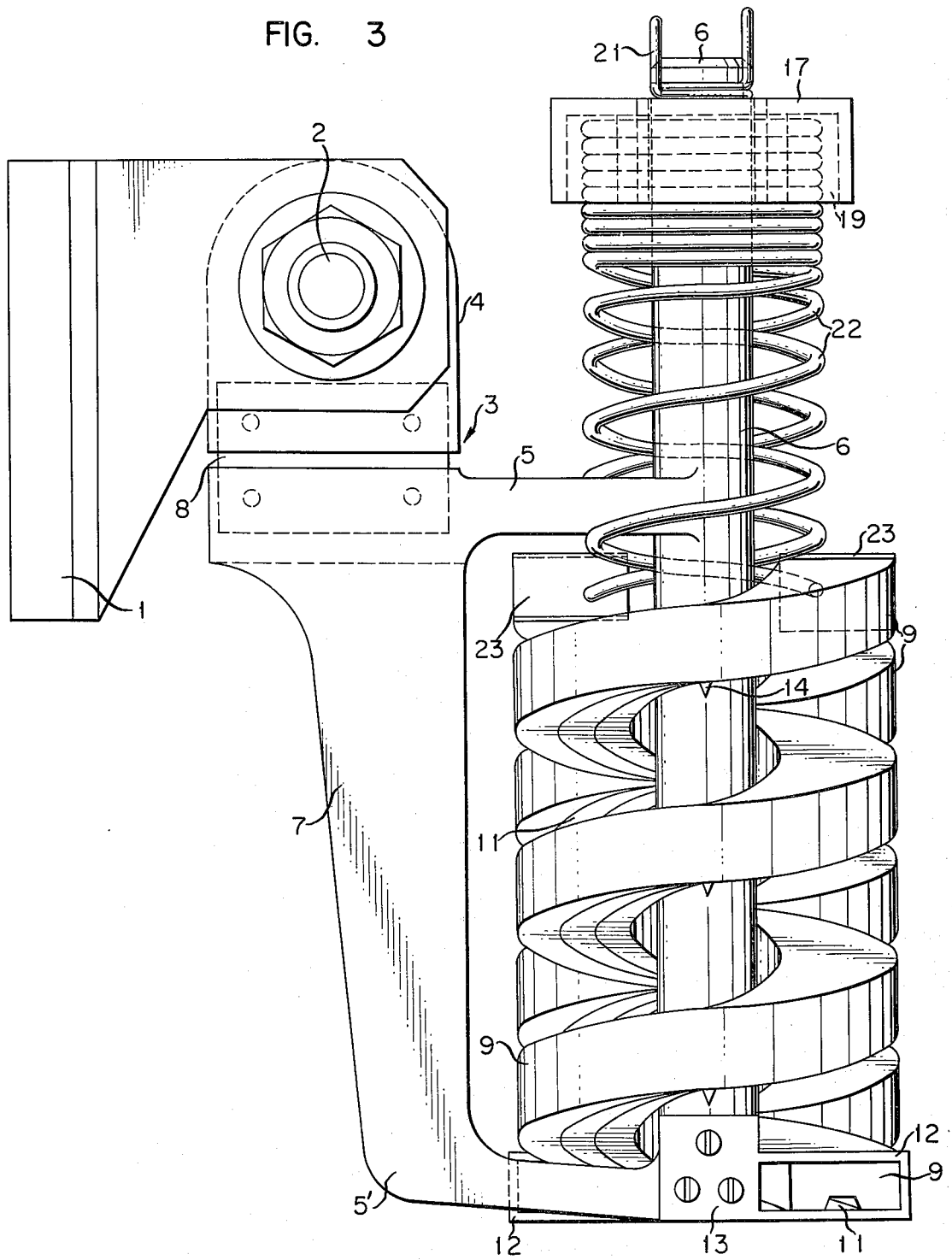
FIG. 3 is a side elevational view.

In FIGS. 1, 2 and 3, the feed device of the present invention is mounted on a mobile body, such as an overhead traveling crane, through a base plate 1 and a carrier device 3 fastened thereto with a bolt-nut assembly 2. The carrier device 3 consists of an upper member 4 with a U-shaped profile, a lower member 7 composed of the arms 5, 5' extending to form a fork-like shape and incorporated as upper and lower portions, respectively, and a pair of support axes or shafts 6 supported to extend vertically by arms 5, 5', each of the support axes 6 mounting respective supply device of the invention. The upper and lower members 4 and 7 are connected together by convenient means through a plate spring 8 absorptive of transverse vibration.

Figure 6:
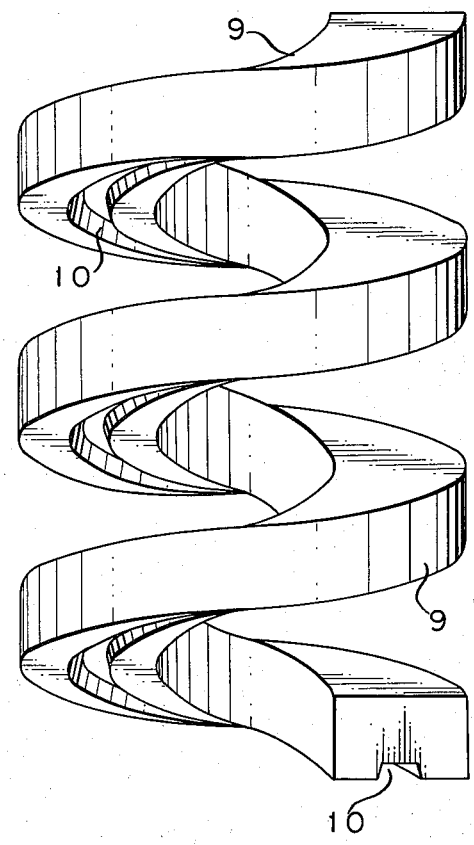
FIG. 6 is a side elevational view of the solid lubricant.

According to the present invention, the solid lubricant 9 is formed in a spiral shape as best shown in FIG. 6 and is provided along the under face thereof with a continuous concave or convex engaging portion 10 (shown as a convex groove in the present embodiment). The surface to be formed with the engaging portion may not be the under face but may be the inner or outer side face. The solid lubricant 9 may be molded by a conventional process from a material such as graphite, molybdenum bisulfide, metal oxide ($Fe_3O_4$, $PbO$ etc.), metal halide ($FeCl_2$, $CaCl_2$, $CdCl_2$, $CuBr_2$ etc.) or metal phosphate.

Figure 4:
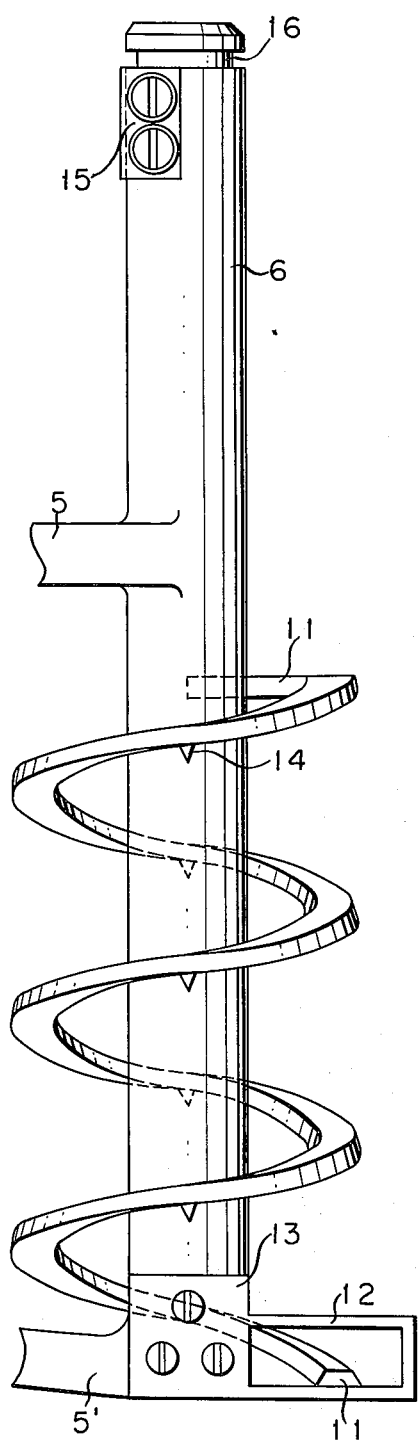
FIG. 4 is a side elevational view of the support axis or shaft mounted with the guide member.
Figure 5:
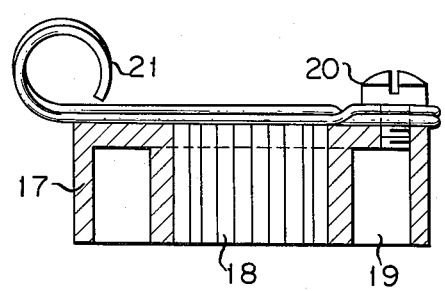
FIG. 5 is a cross sectional view of the head portion of the feed device of FIG. 1.

In FIG. 4, a guide member 11, of a shape mating with the engaging portion 10, is mounted on the support axis 6 for guiding the spiral motion of solid lubricant 9. A suitable number of arms 14 are arranged at convenient intervals along the length of guide member 11 to extend from the under face toward support axis 6 so that the guide member 11 is mounted on the support axis 6. A frame member 13 provided with an opening 12 of an area equal to or a little larger than the cross section of solid lubricant 9 is mounted on the lower end of support axis 6. With such a construction, when solid lubricant 9 is inserted from above the support axis 6 so that the bottom surface of the engaging portion 10 of the solid lubricant, for example, comes to the same level as the upper end surface of guide member 11, then the solid lubricant is guided to make a spiral motion along the guide member 11.

The head of the feed device of the invention includes a ratchet wheel 15 disposed at the upper end of support axis 6 and an annular cap 17 with a central hole 18 having, in its inner peripheral surface, teeth engaged with ratchet wheel 15. The portion 16 of support axis 6 a little above ratchet wheel 15 has a groove for engaging the arms of a squeeze member 21 mounted on the top surface of cap 17 by a screw 20 so that the support axis may support the cap 17.

A coil spring 22 is mounted to embrace the portion of support axis 6 between the head and solid lubricant 9 (see FIGS. 1 and 3). The upper portion of coil spring 22 is fitted in the annular groove 19 of cap 17 and is spiraled in the same direction as solid lubricant 9. Furthermore, the upper end of the coil spring 22 is fastened in the annular groove 19 of cap 17, while the lower end bears on the upper end of solid lubricant 9 through a loading plate 23. Therefore, when cap 17 is rotated in the winding direction of coil spring 22, the solid lubricant aquires a spiral motion, and the lower end of the solid lubricant passes through the opening 12 of frame member 13 and comes to butt against the flange A of a carriage wheel under a certain pressure. The coil spring presents a smaller coilpitch in substantially the upper half and a larger coilpitch in substantially the lower half.

When solid lubricant 9 has rather worn away and its butting pressure on flange A has been weakened, the cap 17 is rotated to the winding direction of coil spring 22 through the squeeze member 21 so as to apply pressure to solid lubricant 9 to move downwardly along a spiral path. As the teeth of central hole 18 engage ratchet wheel 15 so as to permit only rotation in the winding direction of coil spring 22, the rotary power will not be released till solid lubricant has further worn away.

As hereinbefore described, the present invention proposes to employ the solid lubricant molded in a spiral form. The effective utilization length, therefore, will be far larger in comparison with the conventional mode of employing the solid lubricant molded in an arched or linear form, thus assuring a longer useful life. Thus, the frequency of charging the solid lubricant is greatly reduced. In addition, not only is the thrust pressure of the solid lubricant against the flange surfaces of carriage wheels easily controllable by the simple rotation of the cap, but also the manual handling is more convenient than before. Thus the lubricant feed device of the present invention will be evidently advantageous in the practical field of application.

While the invention has been illustrated and described with reference to a single preferred embodiment thereof, it is to be understood that various changes in the details of constructions and the arrangement and combination of parts may be made without departing from the spirit and scope of the invention.

What I claim is:

1. A device, for applying one end of a spiral shape strip of solid lubricant to a surface to be lubricated, comprising, in combination, means forming a support axis; a spiral guide supported on and surrounding said means, and having one end adapted to be positioned adjacent the surface to be lubricated, said spiral guide having a constant pitch and radius and being formed to have supporting and guiding engagement with a spiral strip of solid lubricant when disposed therealong; and means on said device for imparting a spiral force along said spiral guide in the direction of said one end and operable to engage the opposite end of a spiral strip of solid lubricant when supported on said spiral guide and apply pressure thereto to maintain the one end thereof engaged with the surface to be lubricated, and to impart a spiral motion to a spiral strip of solid lubricant when supported on said spiral guide to advance the solid lubricant along said spiral guide as the one end of the solid lubricant is worn away by the surface to be lubricated.

2. The device as set forth in claim 1, wherein said spiral force imparting means comprises a coil spring surrounding said means forming a support axis and having one end adapted to be engaged with the opposite end of a spiral strip of solid lubricant when supported on said spiral guide; and means operatively engaged with the opposite end of said coil spring and operable to impart thereto a torque in a direction to advance said one end of said spiral spring along said spiral guide toward the surface to be lubricated.

3. The device as set forth in claim 2, wherein said torque imparting means comprises an annular cap rotatably mounted on said means forming a support axis; said annular cap having a central opening receiving said means forming a support axis and formed with ratchet teeth on its periphery; a ratchet fixed to said means forming a support axis and engaged with said ratchet teeth to permit rotation of said annular cap only in the winding direction of said coil spring; said annular cap being formed with an annular recess therein and said coil spring being fixedly housed in said annular recess.

4. The device as set forth in claim 1, in combination with a spiral strip of solid lubricant, said spiral strip of solid lubricant formed along the entire length thereof with a spiral guiding formation for engaging said spiral guide.

5. The device as set forth in claim 4, wherein a spiral rib extends along said spiral guide, and the spiral guiding formation of said spiral strip of solid lubricant is a recess in the lower face of the spiral strip of solid lubricant slidably engageable with said spiral rib.

* * * * *